United States Patent Office 3,506,991
Patented Apr. 21, 1970

3,506,991
DYE RECEPTIVE FIBERS AND METHOD
OF PREPARING SAME
John R. Adams, Jr., and Victor S. Salvin, Charlotte, N.C., assignors to Celanese Corporation, New York, N.Y., a corporation of Delaware
No Drawing. Filed July 1, 1964, Ser. No. 379,723
Int. Cl. C09b 67/00
U.S. Cl. 8—173
11 Claims

ABSTRACT OF THE DISCLOSURE

A method for improving the dye receptivity of synthetic fibers, especially resinous copolymers of vinylidene cyanide, by treating the fibers with an organic sulfonic acid such as naphthol sulfonic acids, phenol sulfonic acids and sulfo fatty acids. Preferably, the treatment is effected on preopened fibers using a swelling agent to effect preopening or alternatively, the fiber can be preopened by incorporating an ethylene oxide polymer into the fiber prior to spinning.

---

This invention relates to synthetic fibers of improved dye receptivity and to a novel method for obtaining such fibers. More particularly, this invention relates to synthetic fibers having improved dye receptivity, such fibers having been subjected to treatment with a specified organic sulfonic acid.

Various synthetic resins have been utilized heretofore in the preparation of fibrous materials. One synthetic resin which frequently has been employed for this purpose is a resinous copolymer of vinylidene cyanide with another monomer copolymerizable therewith, for such copolymer possesses valuable fiber-forming characteristics. However, the resulting vinylidene cyanide copolymer fibers have been difficult to dye satisfactorily, particularly as regards the obtaining of dyed fibers exhibiting light fastness and fastness to washing.

The resinous copolymers of vinylidene cyanide which are contemplated herein generally contain in excess of about 45% of vinylidene cyanide (methylene malonoitrile of vinylidene dinitrile) units copolymerized with one or more ethylenically unsaturated monomers such as vinyl acetate or the like, as described in U.S. Patents 2,615,865 through 2,615,880 inclusive; 2,628,954, 2,650,911, 2,654,724, 2,654,728, 2,657,197, 2,716,104, 2,716,105, 2,716,106, and 2,740,769; and, Canadian Patent No. 569,262.

The copolymers usually comprise units of vinylidene cyanide alternated with one or more copolymerizable monomers selected from the following classes of compounds;

(1) Vinyl esters of aliphatic monocarboxylic acids, preferably of the structure RCOOH, wherein R is an alkyl, such as vinyl acetate, vinyl propionate, vinyl butyrate, vinyl isobutyrate, vinyl valerate, vinyl caproate, vinyl enanthate and the like. The copolymerization with vinylidene cyanide of such copolymerizable monomers and the resulting copolymers are described more fully in U.S. Patent 2,615,866, issued Oct. 28, 1952.

(2) Vinyl esters of the structure

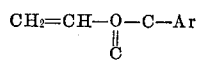

wherein Ar is an aromatic radical in which all the hydrogen atoms are attached to carbon atoms, such as vinyl benzoate; homologs of vinyl benzoate of the formula

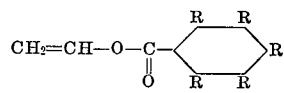

wherein each R is a member of the class consisting of hydrogen atoms or lower alkyl radicals, for example, vinyl toluate and the like; monomers of the above general class wherein the aromatic radical is halogen substituted, such as vinyl p-chlorobenzoate, vinyl o-chlorobenzoate, vinyl m-chlorobenzoate, and similar vinyl halobenzoates and monomers of the above general class wherein the aromatic radical is alkoxy substituted, for example, vinyl p-methoxybenzoate, vinyl-o-methoxybenzoate and vinyl-p-ethoxybenzoate. The copolymerization with vinylidene cyanide, of such monomers, and the resulting copolymers are disclosed in U.S. Patent 2,615,867, issued Oct. 28, 1952.

(3) Styrene and substituted styrenes of the general formula

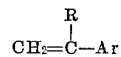

wherein Ar is an aromatic radical in which all of the hydrogen atoms are attached to carbon atoms and R is a member of the class consisting of hydrogen atoms and alkyl radicals, preferably those which contain from 1 to 4 carbon atoms, such as styrene itself, and substituted styrenes such as alpha-methyl styrene, alpha-ethyl styrene, alpha-butyl styrene, alpha-chlorostyrene, alpha-bromostyrene, 2,5-dichlorostyrene, 2,5-dibromostyrene, ortho-, meta-, and para-methoxystyrene, para-alpha-dimethyl styrene, paramethyl styrene, 3,4-dichlorostyrene, 3,4-difluorostyrene, 2,4-dichlorostyrene, 2,4,5-trichlorostyrene, dichloromonofluorostyrenes and the like. Copolymerization of vinylidene cyanide with styrene and substituted styrenes is disclosed in U.S. Patent 2,615,868, issued Oct. 28, 1952;

(4) Olefins of the general structure

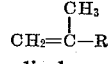

wherein R is an alkyl radical, preferably containing from 1 to 6 carbon atoms, such as isobutylene, (2-methyl propene-1), 2-methyl-butene-1, 2-methylpentene-1, 2,3-dimethylbutene - 1, 2,3-dimethylpentene-1, 2,3,3,-trimethylbutene-1, 2,3,4-trimethylpentene-1, 2,6-dimethyloctene-1, 2-methylnonadecene-1, and the like. Copolymerization of such olefins with vinylidene cyanide is disclosed in U.S. Patent 2,615,865, issued Oct. 28, 1952;

(5) Alkyl esters of methacrylic acid which possess the structure

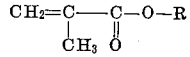

wherein R is an alkyl radical, preferably containing from 1 to 8 carbon atoms, for example, methyl methacrylate, ethyl methacrylate, propyl methacrylate, butyl methacrylate, amyl methacrylate, hexyl methacrylate, heptyl methacrylate, octyl methacrylate, decyl methacrylate, and the like. Vinylidene cyanide/alkyl methacrylate copolymers and their preparation are disclosed in U.S. Patent 2,615,871, issued Oct. 28, 1952;

(6) 2-halogenated monolefins of the structure

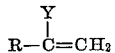

wherein R is a lower alkyl radical such as methyl, ethyl, propyl or butyl, and Y is halogen atom, such as 2-chloropropene, 2-chlorobutene, 2-chloropentene, 2-chlorohexene, 2-chloroheptene, 2-bromobutene, 2-bromoheptene, 2-fluorohexene, 2-fluorobutene, 2-iodopropene, 2-iodopentene, and the like. Copolymerization of these compounds with vinylidene cyanide is disclosed in U.S. Patent 2,615,877, issued Oct. 28, 1952;

(7) Isopropenyl esters of organic monocarboxylic acids, preferably of the formula RCOOH, wherein R is an alkyl radical containing from 1 to 6 carbon atoms, and including isopropenyl acetate, isopropenyl propionate, isopropenyl isobutyrate, isopropenyl valerate, isopropenyl caproate, and isopropenyl enanthate; as well as isopropenyl esters of aromatic carboxylic acids, for example, isopropenyl benzoate, isopropenyl, p-chlorobenzoate, isopropenyl o-chlorobenzoate, isopropenyl m-chlorobenzoate, isopropenyl toluate, isopropenyl alpha-chloroacetate, isopropenyl alpha-bromo propionate, and the like; the copolymerization of all of which with vinylidene cyanide is described in U.S. Patent 2,615,875, issued Oct. 28, 1952;

(8) Vinyl esters of alpha-halo saturated aliphatic monocarboxylic acids of the structure

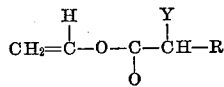

wherein R is a member of the class consisting of hydrogen and an alkyl radical, preferably a lower alkyl radical, and Y is a halogen atom, such as vinyl alpha-chloroacetate, vinyl alpha-bromoacetate, vinyl alpha-iodopropionate, vinyl alpha-bromovalerate and the like. The copolymerization of such monomers with vinylidene cyanide is described in U.S. Patent 2,615,876 issued Oct. 28, 1962.

(9) Vinyl halides such as vinyl chloride, vinyl bromide and the like, which are copolymerized with vinylidene cyanide as described in U.S. Patent 2,615,869, issued Oct. 29, 1952.

In addition to interpolymers of vinylidene cyanide containing the essentially 1 to 1 molar alternating structure and essentially 50 mol percent vinylidene cyanide units, such as those disclosed in the patents referred to above, other vinylidene cyanide interpolymers have been described. For example, there are included interpolymers, of this vinylidene cyanide content, made from vinylidene cyanide and more than one copolymerizable monoolefinic compounds, at least one of which forms an essentially 1:1 alternating copolymer when copolymerized with vinylidene cyanide, a large number of which interpolymers are disclosed in U.S. Patent 2,716,106.

Other polymerizable monoolefinic compounds form interpolymers with vinylidene cyanide, in addition to those set out above including, by way of example, the following classes of compounds:

Monoolefinic hydrocarbons, such as 2,3-dimethylhexene-1; 2,3,4-trimethyl-pentene-1; ethylene; propylene; butylene; amylene; hexylene and the like;

Esters of unsaturated acids other than methacrylic, e.g., of acrylic acid and tiglic acid such as methyl acrylate, ethyl acrylate, propyl acrylate, isopropyl acrylate, amyl acrylate, 3,5,5-trimethylhexylacrylate, dodecylacrylate and ethyl tiglate.

Allyl and substituted allyl esters such as allyl chloride, allyl cyanide, allyl bromide, allyl fluoride, allyl iodide, allyl nitrate, allyl thiocyanate, allyl butyrate, allyl benzoate, allyl 3,5,5-trimethyl hexoate, allyl lactate, allyl pyruvate, allyl acetoacetate, allyl thioacetate, as well as methallyl esters corresponding to the above allyl esters from such alkenyl alcohols as beta-ethyl allyl alcohol, as well as esters from such alkenyl alcohols as beta-ethyl allyl alcohol, beta-propyl allyl alcohol, and alkenyl alcohols as beta-ethyl allyl alcohol, beta-propyl allyl alcohol, and 1-butene-4-ol;

Esters of substituted acrylic acids, such as methyl alpha-chloroacrylate, methyl alpha-bromoacrylate, ethyl alpha-chloroacrylate, propyl alpha-chloroacrylate, amyl alpha-chloroacrylate, 3,5,5-trimethyl hexyl alpha-chloroacrylate and decyl alpha-cyano acrylate;

Esters of monoethylenically unsaturated dicarboxylic acids, such as dimethyl maleate, diethyl maleate, dimethyl fumarate and diethyl fumarate;

Monoolefinically unsaturated organic nitriles such as propene-1, crotonitrile, oleonitrile and the like;

Monoolefinically unsaturated carboxylic acids such as acrylic acid, methacrylic acid, crotonic acid, butenoic acid, angelic acid, tiglic acid and the like;

Of these vinylidene cyanide copolymers a particularly useful copolymer which can readily be converted to filaments of excellent pyhsicals properties is the copolymer of vinylidene cyanide and vinyl acetate preferably consisting essentially of a regular structure of alternated units of the monomers, i.e., approximately 50 mol percent of each.

It is frequently desirable to employ a mixture of more than one of the foregoing vinylidene cyanide polymers in order to form fibers. The fibers may also contain various additives in addition to the vinylidene cyanide polymer or polymers, e.g., a polymer of N,N-dimethyl acrylamide, a coplymer of N,N-dimethyl acrylamide and vinyl acetate, and so forth.

As is well known in the art, copolymers of vinylidene cyanide have particular application in fiber-forming techniques, and generally are wet-spun in order to produce fibers. As previously noted, however, the resulting fibers have been difficult to dye satisfactorily.

It is therefore an object of this invention to provide a method for improving the dye receptivity of synthetic fibers.

A further object is to provide a method for improving the dye receptivity of vinylidene cyanide copolymer fibers.

Another object is to provide synthetic fibers, e.g. vinylidene cyanide copolymer fibers, of improved dye receptivity.

Additional objects, features, characteristics, and advantages of the invention will become apparent hereinafter.

In accordance with one aspect of the invention, the synthetic fibers, e.g., vinylidene cyanide copolymer fibers are subjected to an "opening" treatment, and the thus "opened" fibers are treated with an organic sulfonic acid to thereby introduce sites in the fibers, which sites render the fibers receptive to cationic dyes.

The purpose of the "opening" treatment is to prevent close packing of the fiber molecules and thereby permit water-containing dyes to penetrate the fiber.

The preliminary opening of the vinylidene cyanide copolymer fibers may be effected by treatment with an appropriate swelling agent, e.g., acetone methyl-ethyl ketone, 3-sulfolene, phenyl acetonitrile, and the like. Alternatively, the opening can be effected by incorporating in a spinning solution containing the vinylidene cyanide copolymer which is to be wet spun, a suitable polymeric material which, upon extrusion with the vinylidene cyanide copolymer, is spun directly into the resulting fiber. Exemplary of the polymeric materials which may be employed as an opening agent are ethylene oxide polymers having a molecular weight ranging from about 6,000 to about 200,000. These ethylene oxide polymers are generally employed in amounts of from about 5 to about 10%, by weight, of the vinylidene cyanide copolymer. Any of the conventional wet-spinning processes well known to the practitioner may be used to spin these fibers.

When a swelling agent is employed to open the vinylidene cyanide copolymer fibers, the temperature and the time of treatment will usually vary with the particular agent. Thus, for example, when acetone is utilized, the fiber is treated for about one minute at 25° C.

The fibers, as opened by the treatments described previously, are then treated with an organic sulfonic acid. Suitable sulfonic acids include naphthol sulfonic acids such as, e.g., 1-naphthol-3,8-disulfonic acid, 2-naphthol-7-sulfonic acid, 1-naphthol-2-sulfonic acid, 1-naphthol-5-sulfonic acid, and the like; phenol sulfonic acids such as, e.g., p-phenol sulfonic acid, 5-sulfosalicylic acid, and the like.

The treatment of the vinylidene cyanide copolymer fibers with the organic sulfonic acid compound is desirably carried out by immersing the fibers in a solution of the organic sulfonic acid. The solution contains from about 3 to about 10 percent, by weight of the organic sulfonic acid, from about 50 to about 90 percent, by weight acetone, and from about 10 to about 50 percent, by weight of water, all percentages being based on the weight of the fibers.

Preferably, the solution may contain from 70 to 85 percent of acetone and from 15 to 30 percent of water.

The temperature of such solutions may vary from about 10° to about 40° C., a more preferred range being from about 20° to 30° C.

The time of treatment is generally from about 0.5 to 5 minutes, and preferably from about 0.75 to 1.5 minutes.

It should be noted that, ultimately, the fibers prepared in accordance with the invention contain from about 1 to about 6%, by weight, of the organic sulfonic acid utilized to provide sites for cationic dyes, said weight percentage being based on the weight of the fibers.

After the foregoing treatment, the resulting fibrous material is readily dyed with basic dyes. Typically, the dyeing is carried out for from about ½ hour to 2 hours at a temperature of from about 80° to about 100° C. A more preferred range is from about 1 to 1½ hours at a temperature of from about 95° to 100° C. Generally, from about 0.1% to about 5%, by weight of the dye, as based on the weight of the fiber, is employed. The amount of dye employed will depend on the depth of shade desired in the fiber. Basic dyes which may be employed include Sevron Red 4G, Sevron Yellow R, Maxilon Blue RLA, Maxilon Blue GLA, Maxilon Red BL, and the like, all of which are listed in the Colour Index, published by the Society of Dyers and Colourists, England, second edition (1956) volume 4 and 1963 Supplement.

The fibrous material dyed in accordance with the invention is dyed with a good intensity and exhibits enhanced fastness to washing and to light.

The following example will further illustrate our invention. All parts are by weight unless otherwise indicated.

EXAMPLE

Unset fibers, comprised of a copolymer of 50 mole percent vinylidene cyanide and 50 mole percent vinyl acetate, were immersed in a solution consisting of 76 percent acetone, 19 percent water, and 5 percent 1-naphthol-3,8-disulfonic acid for 1 minute at 25° C. Thereafter, the fibers were removed and given a thorough water rinse to remove residual acetone. The fibers were then treated for 60 minutes at 95–100° C. with the basic dye Sevron Red 4G, using about 2%, by weight of the dye on the fiber weight. The pH of the dyeing solution was maintained at 6 by using acetic acid buffered with sodium acetate. The fibers were dyed an intense red and the dye was fast to washing and to light.

While our invention has been described with reference to improving the dye-receptivity of vinylidene cyanide copolymer fibers, it will be understood that the invention also has application to other synthetic fibers which heretofore have been difficult to dye satisfactorily. For example, the method of our invention finds application to synthetic fibers made of cellulose derivatives, such as cellulose acetate, cellulose propionate, cellulose butyrate, cellulose acetate-propionate, cellulose acetate-formate, cellulose acetate-butyrate, cellulose benzoate, methyl cellulose, ethyl cellulose, benzyl cellulose, and the like. A cellulose ester particularly applicable is one which contains fewer than about 0.5 free hydroxyl groups or preferably fewer than about 0.25 free hydroxyl groups per anhydroglucose unit in the cellulose molecules (generally referred to as cellulose triesters) such as cellulose triacetate having an acetyl value of at least about 57% by weight and preferably at least 60% by weight. It should be noted that, when our process is applied to fibers of cellulose esters, aqueous alcohol (e.g., ethanol) would be the preferred swelling agent. It should also be noted that the process of our invention is equally applicable to fibers, as well as to fibers of the vinylidene cyanide copolymers previously described.

Any departure from the above description which conforms to the present invention is intended to be included within the scope of the invention as defined by the following claims.

The embodiments of the invention in which an exclusive property or privilege is claimed are defined as follows:

1. A method of improving the dye receptivity of vinylidene cyanide fibers comprising spinning a fiber from a solution of a vinylidene cyanide copolymer of the structure

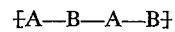

wherein A represents the polymerized residue of vinylidene cyanide monomer and B represents the polymerized residue of another copolymerizable monomer, opening said spun fiber, treating said fiber with a solution of a hydroxy aromatic sulfonic acid at a temperature of about 10 to 40 degrees centigrade for at least 0.5 minute and subsequently dyeing said fiber.

2. The method of claim 1 wherein B represents the copolymerized product of N,N-dimethylacrylamide and vinyl acetate.

3. The method of claim 1 wherein B represents the polymerized residue of vinyl acetate.

4. The method of claim 1 wherein the hydroxy aromatic sulfonic acid solution contains about 3 to about 10 percent by weight of said fibers of said hydroxy aromatic sulfonic acids.

5. The method of claim 1 wherein the hydroxy aromatic sulfonic acid is a methyl sulfonic acid.

6. The method of claim 1 wherein the opening is effected by immersing said fibers in a swelling solvent therefor.

7. The method of claim 1 wherein opening of the fiber is effected by forming a spinning solution containing said vinylidene cyanide copolymer and about 5 to 10 percent based on said copolymer of an ethylene oxide polymer having a molecular weight ranging from about 6,000 to about 200,000 and spinning said solution to form said synthetic fiber.

8. The method of claim 1 wherein the solution of hydroxy aromatic sulfonic acid contains about 3 to 10 percent of said organic sulfonic acid, from about 50 to 90 percent of acetone and from about 10 to about 50 percent of water, all weight percents being based on the weight of said fiber for 0.5 to about 5 minutes.

9. The method of claim 1 wherein the fiber absorbs about 1 to 6 percent of the hydroxy aromatic sulfonic acid.

10. The fiber product produced by the process of claim 1.

11. The fiber product produced by the process of claim 7.

References Cited

UNITED STATES PATENTS

| | | | |
|---|---|---|---|
| 3,156,519 | 11/1964 | Kallman et al. | 8—55 |
| 3,206,420 | 9/1965 | Smart et al. | 260—23 |
| 3,300,272 | 1/1967 | Robinson | 8—100 |
| 2,100,398 | 11/1937 | Klein | 8—5 |
| 2,215,196 | 9/1940 | Schlack | 8—29 |
| 2,879,177 | 3/1959 | Nelson et al. | 8—55 |
| 3,014,776 | 12/1961 | Mecco | 8—55 |
| 3,101,988 | 8/1963 | Bassard | 8—41 |

FOREIGN PATENTS

| | | |
|---|---|---|
| 224,925 | 11/1924 | Great Britain. |
| 37/5,823 | 6/1962 | Japan. |
| 38/4,791 | 4/1963 | Japan. |
| 38/11,868 | 7/1963 | Japan. |

NORMAN G. TORCHIN, Primary Examiner

J. E. CALLAGHAN, Assistant Examiner

U.S. Cl. X.R.

8—89